March 10, 1964    D. BARTELSON    3,123,921
TRAINING DEVICE
Filed Oct. 18, 1960    2 Sheets-Sheet 1
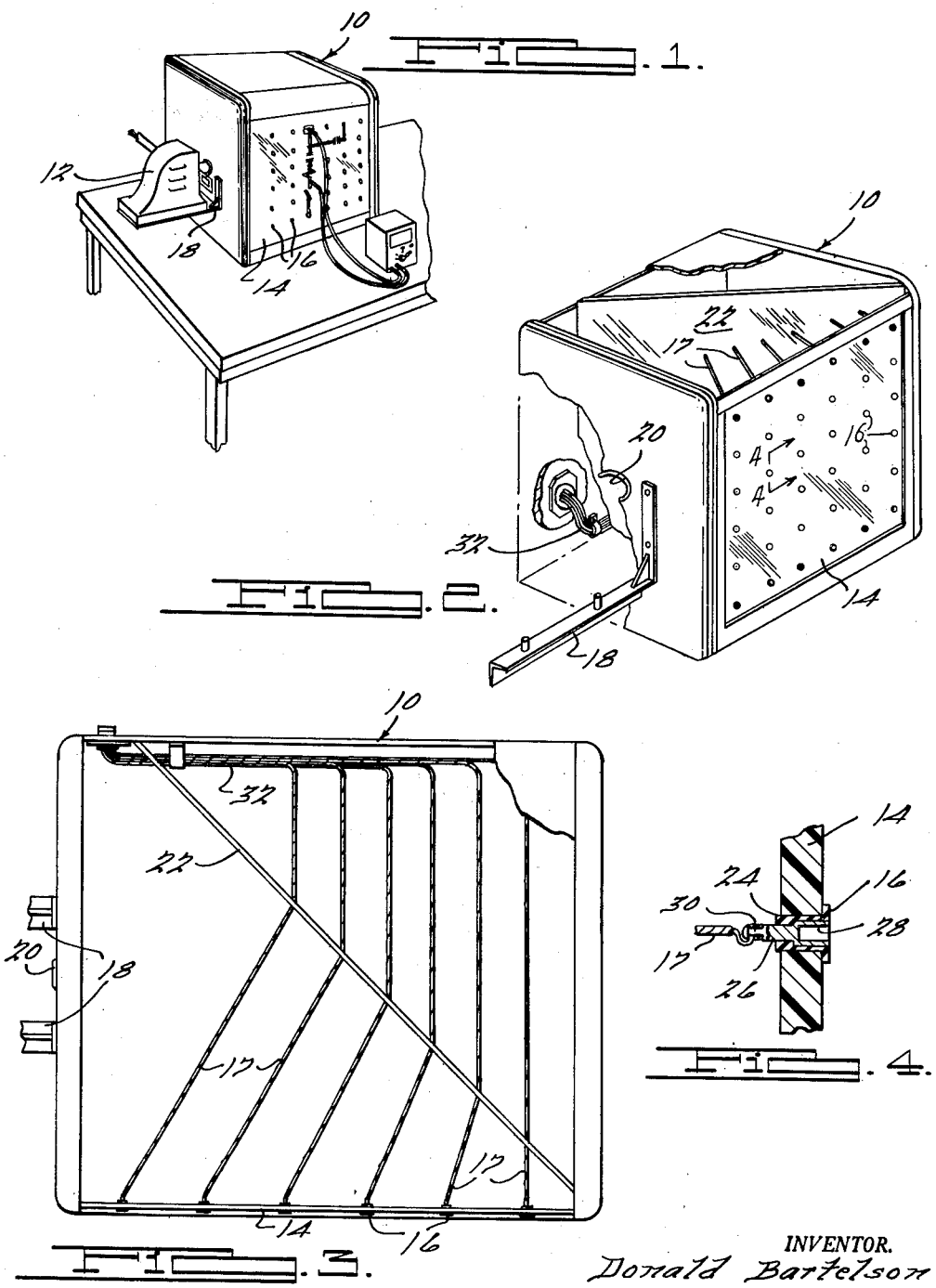
INVENTOR.
Donald Bartelson
BY
Harness and Harris
ATTORNEYS.

March 10, 1964
D. BARTELSON
3,123,921
TRAINING DEVICE
Filed Oct. 18, 1960
2 Sheets-Sheet 2
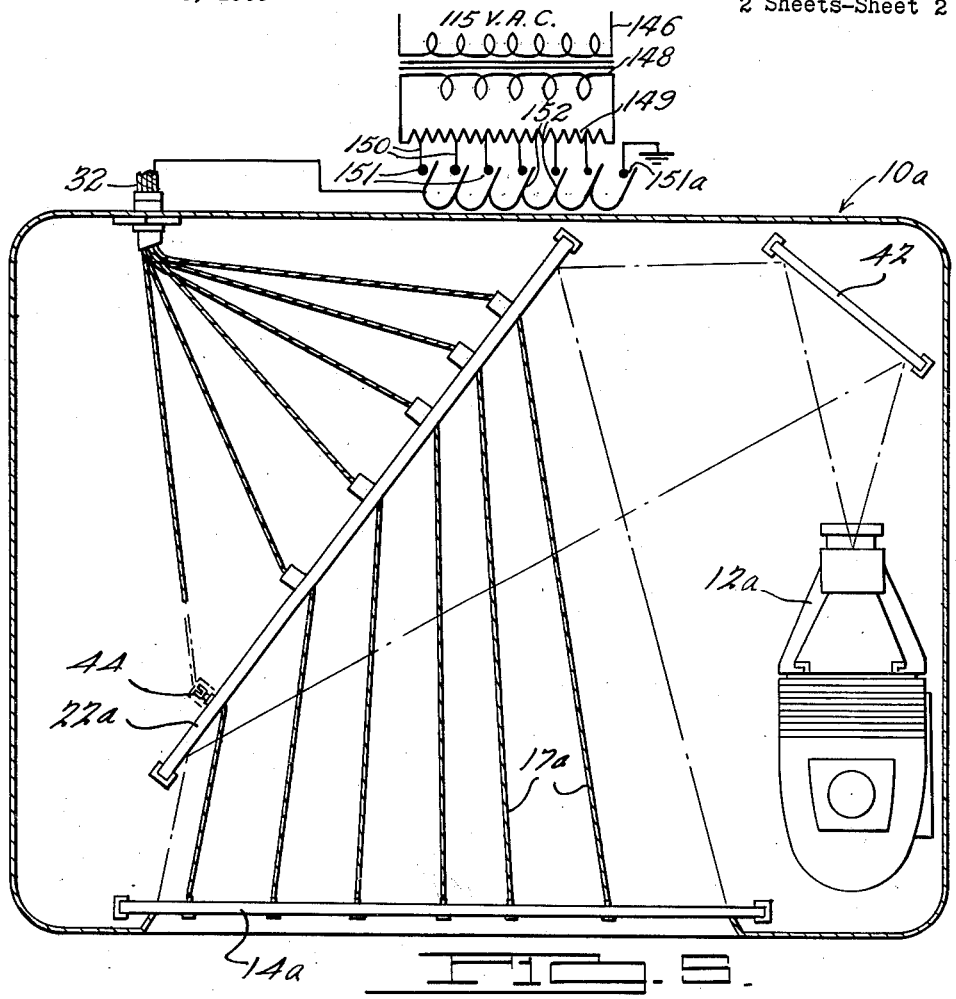
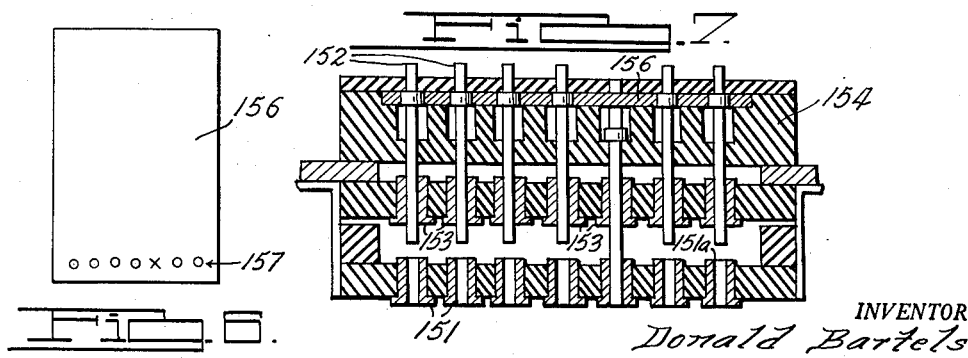
INVENTOR.
Donald Bartelson
BY
Harness and Harris
ATTORNEYS.

United States Patent Office 3,123,921
Patented Mar. 10, 1964

3,123,921
TRAINING DEVICE
Donald Bartelson, Mount Clemens, Mich., assignor to Chrysler Corporation, Highland Park, Mich., a corporation of Delaware
Filed Oct. 18, 1960, Ser. No. 63,349
11 Claims. (Cl. 35—19)

The present invention relates to a training device that provides realistic simulation of complex electronic, pneumatic, and hydraulic circuits and of the problems encountered in trouble-shooting and repairing such circuits.

In modern-day technology the equipment being developed by both military and private research is increasingly more complex. This complexity of modern equipment has all but antiquated conventional concepts of training devices and their instructional use.

It has long been the custom to use actual equipment to train personnel in manufacture, operation, and maintenance. The complexity of modern equipment makes it impractical and uneconomical to follow such custom and has produced a need for training devices that will accurately simulate actual situations that may be encountered in the use of the equipment.

Training personnel agree that correction of equipment failure is 90% mental and 10% physical labor. Accordingly, there is a need for a training device that will provide the mental practice required to develop skill in equipment maintenance and repair.

It is accordingly one object of the present invention to provide a training device that will realistically simulate actual problems encountered in the maintenance and repair of complex modern equipment.

Another object of the present invention is to provide such a device that includes both visual display of electrical, pneumatic, and hydraulic circuits and means to analyze the displayed circuit with conventional test apparatus.

A further object of the present invention is to provide a training device having a plane surface upon which an image of an actual circuit may be projected and which includes on such surface test points oriented in such image and means for reproducing at such test points actual conditions which would be encountered in the trouble-shooting and repair of such circuits.

A further object of the present invention is to provide a training device for simulating actual operating conditions of complex equipment and which is readily adaptable to change to accommodate a large variety of circuits.

A still further object of the present invention is to provide a training device resulting from a unique blending of optics and electronics and, therefore, not subject to rapid obsolescence.

Another object of the present invention is to provide a training device for simulating of actual situations encountered in the maintenance and repair of complex electronic, pneumatic, and hydraulic circuits which is readily adaptable to mass production methods and sufficiently simple in construction to be economical for individual instruction of a large number of students.

Other objects of this invention will appear in the following description and appended claims, reference being had to the accompanying drawings forming a part of this specification wherein like reference characters designate corresponding parts in the several views.

In the drawings:

FIG. 1 is a perspective view of a student unit embodying the present invention,

FIG. 2 is a perspective view similar to FIG. 1 but having portions broken away for clarity, FIG. 3 is a top view of the device as illustrated in FIG. 2, FIG. 4 is a partial sectional view taken on the line 4—4 of FIG. 2, in the direction of the arrows, and showing one of the test probe contacts embedded in the screen, and FIG. 5 is a top plan view of a modification of the student unit shown in FIGS. 1–4 and includes a schematic showing of the source of variable potential utilized in the present invention, FIGURE 6 is a drawing of the punch card utilized as a programmer, and FIGURE 7 is a simplified showing of the manner in which the punch card programmer operates.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In describing the embodiment of the present invention, its use for training students in ths analysis and repair of electrical circuits will be referred to. It is to be understood, however, that it is within the contemplation of the present invention to utilize the device for simulating pneumatic and hydraulic circuits as well as electrical circuits. This may be very simply accomplished by utilizing electric potential in place of pneumatic or hydraulic pressure with an accompanying stated translation of electrical measurement to pneumatic or hydraulic pressure measurement, or, the electrical test instruments may actually be calibrated in such pressure units instead of in electric units.

The objects of the present invention are accomplished by a training device that provides each student with a small rectangular cabinet, perhaps 27" high x 21" wide x 19" deep, having a slide projector mounted therein and having in its front face a rear projection screen with electrical test probe contacts embedded therein. Behind the screen there is a front surface mirror set at an angle so as to reflect an image of a circuit diagram from the projector onto the rear of the screen. The circuit diagram is so drawn on the slide that, when projected on the screen, test points in the diagram coincide with certain of the probe contacts embedded in the screen. The test probe contacts are connected, by wires passing back through the mirror, to a punch card programmer that, in turn, connects to a power supply to produce any desired electric potential at any test probe contact. The instructor may program each slide to set up the electric potential at the probe contacts that would be encountered in the proper functioning or malfunctioning of the actual equipment. Using conventional electric test equipment the student can analyze the circuit directly on the projection screen.

In FIG. 1 of the drawings, the illustrated embodiment of the invention comprises the cabinet 10 including a slide projector 12 mounted on one end of the cabinet to project an image thereinto. There is shown in FIG. 1 an image of a portion of an electrical circuit diagram visible on the rear projection screen 14 that forms the front face of the cabinet 10 and it can be seen that certain of the test probe contacts 16 embedded in the screen coincide with test points in the circuit. As shown, conventional testing equipment, such as a voltmeter, is connected to the test probe contacts 16 by conventional test leads to analyze the circuit.

In FIG. 2 of the drawings the slide projector has been removed and portions of the walls of the cabinet have been broken away to show details of construction. The brackets 18, only one of which is visible, are provided to mount the projector and the opening 20 is provided through the end wall of the cabinet sufficiently large to clear the lens of the projector. The projector is a slightly modified commercially available unit with a manually operated slide magazine.

Inside the cabinet a front surface mirror 22 is placed at an angle to the screen 14 so as to reflect the image issuing from the projector onto the rear of the screen. I have found it advantageous to utilize Plexiglas or other plastic material for the mirror and to coat the front face of the Plexiglas by means of aluminum vapor-plating or other suitable techniques to provide a reflecting surface.

In the screen 14 a number of test probe contacts 16 are embedded. Wires 17 leading from these contacts back through the mirror are joined into a cable 32 that passes out through the rear wall of the cabinet. These wires are as small as possible and run from the contacts back to and through the mirror along lines parallel to the theoretical lines of the rays of light being reflected from the projector onto the back of the screen. In this manner the wires do not interfere with the projection of the image of the circuit onto the screen since they appear on the screen only as dots directly behind the probe contacts. Where the rays of light from the projector must cross the wires before hitting the mirror, diffusion of the light after passing the wires obviates any interference in the image being projected onto the screen. I have found it suitable to utilize steel wire of .006" diameter for his purpose. This means that I need only drill small holes through the mirror. It is, of course, obvious that where the wires pass through the mirror a tiny amount of the metallic reflecting surface on the mirror must be removed immediately around the wires so that they will not be shortcircuited through the reflecting material.

In FIG. 4, there is shown a cross-sectional view, taken on the line 4—4 of FIG. 2 in the direction of the arrows, of one of the test probe contacts 16 embedded in the screen. The contact includes an insulating bushing 24 having elastic properties such that when the contact is inserted into a bore provided for it in the screen the bushing will serve to retain the contact in place. Passing through the bushing is a metallic stud 26 having a recess 28 in the front face thereof to facilitate insertion of a conventional test probe and also having a projection 30 on the rear thereof to which one of the wires 17 can be affixed.

The wires leading from the contacts are gathered into a cable 32 behind the mirror. This cable connects the contacts to a punch card programmer (not shown). The punch card programmer determines the electric potential that will appear at each test point. Any test point can have any given potential or may be grounded. Suitable punch card programmers are readily available as standard commercial items well known to those skilled in the art. The punch card programmer, or control unit, which has been utilized in actual practice of the present invention, was manufactured by Hickok Electrical Instrument Company of Cleveland, Ohio, and is shown and described in U.S. Patent 2,825,773. The programmer serves as switch means between a power supply and the test probe contacts in a manner diagrammatically shown and described in connection with FIGURE 7 hereinafter.

In FIG. 5 of the drawing there is shown a modification of the present invention wherein the projector 12a is permanently affixed inside the cabinet 10a. This feature is accomplished by introducing a mirror 42 between the projector and the mirror 22a. The projector 12a is then aimed at the mirror 42 instead of at the mirror 22a. The light issuing from the projector is reflected from the mirror 42 onto the mirror 22a and thence to the rear of screen 14a.

There is also illustrated in FIG. 5 details of affixing the wires 17a between the test probe contacts on the screen and the mirror 22a. To facilitate the use of extremely fine wires, terminal posts 44 are provided on the back of the mirror 22a. The wires 17a then need only run to these terminals and the wires in the cable from the programmer can be affixed to the terminal. This method of affixing the wires is, of course, equally usable in the previously described modification of FIGS. 1–3. As has been previously stated in connection with the description of the modification illustrated in FIGURES 1–3, the wires from the programmer to the test points are gathered into a cable 32. In the device shown where there are six rows and six columns of test points there would be a total of thirty-six wires in the cable 32, i.e., one wire for each test point. In FIGURE 5, one of these wires in the cable 32 is continued into a schematic illustration of a suitable punch card programmer (described in more detail in connection with FIGURE 7) and a typical power supply so as to show schematically how the punch card programmer determines the electric potential that will appear at each test point. As shown, a source of alternating current is applied to the primary winding 146 of an A.C. transformer. An output winding 148 has coupled thereto a potentiometer 149. A series of variable taps 150 are connected to the fixed contacts 151 of a row of normally open switches in the punch card programmer except that one of these contacts 151a is connected to the common ground of the power supply. The movable contacts 152 of this row of normally open switches are all connected to the wire in the cable 32 leading to one particular test point. Thus, depending upon which of the switches is closed the test point can be provided with any desired potential or ground. It should further be noted that the A.C. voltages may be transformed into D.C. voltages, if so required, by means obvious to those skilled in the electrical art.

FIGURE 7 shows a cross section of a punch card programmer, such as is illustrated in FIG. 4 of the previously mentioned Avdeenko patent No. 2,825,773. Briefly, the punch card programmer comprises a plurality of normally open switches with the closing of each switch being determined by a punched card such as is illustrated in plan view in FIGURE 6. In FIGURE 7 there is illustrated a row of movable contacts 152, as mentioned in connection with the schematic diagram portion of FIGURE 5. Connection to these movable contacts is made by means of the hollow guide members 153. These movable contacts are arranged in an upper carrier member 154 which moves downwardly and in so doing activates selected ones of the movable contacts 152 as controlled by the punch card 156. The details of this actuation are described completely in the Avdeenko patent and it is sufficient to state for the present purposes that where a perforation is provided in the punch card that movable contact will not be actuated. Where the card is imperforate the movable contact will be actuated. For example, as shown in FIGURE 6 the row of perforations controlling the row of movable contacts illustrated in FIGURE 7 is indicated at 157. It will be noted that perforations are provided for each of the movable contacts 152 except in the one spot indicated with an X where the card is not perforated. Thus, as illustrated in FIGURE 7, this movable contact is actuated and is urged downwardly to engage the corresponding fixed contact. In FIGURE 6 only one row of the perforations 157 is illustrated, it being understood that for the training device being described where there are thirty-six test points there would be thirty-six such rows.

The fixed contacts 151 are arranged in the lower carrier member of the punch card programmer and, as shown schematically in FIGURE 5, six of these fixed contacts are connected respectively with one of the taps 150 to the potentiometer with the seventh one of them 151a being connected to the common ground of the power supply.

The operation of the illustrated training device is as follows:

The instructor's classroom preparation includes drawing on slides portions of the circuit to be studied with significant test points therein coinciding with certain of the test probe contacts on the screen when the slide is projected. He then prepares the necessary punch card to be used in the programmer for each slide. A number of different punch cards may be prepared for each slide—each punch card simulating a predetermined malfunctioning in that portion of the circuit.

A number of the illustrated student units are provided in the classroom so that one or a small group of students can utilize each unit. A slide is positioned in the projector and the circuit which it carries is projected on the screen of the unit. At the same time, the instructor places the corresponding punch card in the programmer to establish predetermined voltages at the test points on the screen such as would be present if the actual equipment were operating with a malfunction known only to the instructor.

Using the actual training manuals provided for maintenance and repair of the actual equipment a student can determine what voltages should appear at the various test points if the malfunction were not present. Then, by connecting test leads from his voltmeter to the test points on the screen he can check at various points in the circuit to pinpoint the seat of the trouble.

The student goes through the mental exercise of analyzing where in the circuit the trouble would show up that would result in the malfunction the instructor has programmed. This simulation of actual operating conditions that can be expected will rapidly train the student to isolate the components of the circuit that are causing any particular malfunction. Once this troubleshooting has been done the replacement of the malfunctioning component or other necessary correction is a simple matter and need not actually be done by the student in training.

It is the training of the student in analyzing the circuit to isolate the trouble spot that will develop most of the skills necessary for effective maintenance and repair of the actual equipment.

The training device just described is not subject to becoming obsolete since when circuitry of the equipment changes it is only necessary to make new slides and punch cards for the training device.

As has been previously mentioned, if it is desired to utilize this training device for pneumatic or hydraulic circuits the symbols for these components are utilized in preparing the slides. The test instruments to be used by the student may be calibrated in corresponding units, such as pounds per square inch, or the student may be given a table to translate voltage measurement to pneumatic or hydraulic pressure measurement if it is not desired to so modify the test equipment.

The training device of the present invention may be very easily manufactured at a small cost when compared to using actual equipment or mock-ups of actual equipment. Any number of student units may be controlled from one central power supply and programmer. Thus, the training device embodying the present invention may be comparatively inexpensively utilized for classroom instruction.

While I have described and illustrated an embodiment of the present invention that utilizes a unit for each student or group of students, the structural features illustrated can very easily be embodied into a single large similar unit that could be utilized by the instructor for lecture purposes.

Having thus described my invention, I claim:

1. A training device comprising: a screen having test probe contacts thereon; means to project a circuit diagram onto said screen with test points therein coinciding with certain of said contacts on said screen; and means to supply predetermined electric potential to said coinciding test points on said screen thereby simulating actual functioning of said circuit.

2. A training device comprising: a rear projection screen having test probe contacts thereon and accessible from the front thereof; means to project a circuit diagram on the rear surface of said screen so as to be visible from the front with test points in said diagram coinciding with certain of said contacts on said screen; and means to provide predetermined electric potential to said coinciding test points on said screen thereby simulating actual functioning of said circuit.

3. A training device comprising: a rear projection screen having test probe contacts thereon accessible from the front thereof; a projector adapted to project a circuit diagram with test points therein coinciding with certain of said contacts on said screen; a reflector positioned behind said screen to receive the projection from said projector and reflect it onto the rear of said screen; and means to provide predetermined electric potential to each of said coinciding test points on said screen thereby simulating actual functioning of said circuit.

4. A training device comprising: a rear projection screen having test probe contacts thereon accessible from the front thereof; a projector adapted to project a circuit diagram with test points therein coinciding with certain of said contacts on said screen; a reflector positioned behind said screen to receive the projection from said projector and reflect it onto the rear of said screen; electric conductors extending from each of said contacts on said screen through said reflector and parallel to the path of light beams passing from said reflector to said screen; and means to provide predetermined electric potential to each of said conductors thereby simulating actual functioning of said circuit.

5. A training device comprising: a rear projection screen having test probe contacts embedded therein and accessible from both faces of said screen; a mirror positioned behind said screen; a slide projector aimed at said mirror; a slide in said projector having a circuit diagram thereon including test points coinciding with certain of said contacts in said screen, said projector and said mirror being so positioned with respect to each other as to reflect light rays issuing from said projector onto the rear face of said screen; electric conductors extending from each of said contacts on said screen and through said mirror parallel to the path of said reflected light; and a programmer connecting said conductors to a power supply thereby providing predetermined electric potential at each of said coinciding test points on said screen to simulate actual functioning of said circuit.

6. A training device comprising: a rear projection screen having test probe contacts thereon accessible from the front thereof; a projector adapted to project a circuit diagram with test points thereon coinciding with certain of said contacts on said screen; a first reflector positioned in front of said projector; a second reflector positioned behind said screen, said first reflector being oriented to reflect light rays from said projector onto said second reflector and said second reflector being oriented to reflect said light rays onto the rear of said screen; and means to provide predetermined electric potential to each of said coinciding test points on said screen thereby simulating actual functioning of said circuit.

7. A training device comprising: a rear projection screen having test probe contacts thereon accessible from the front thereof; a projector adapted to project a circuit diagram with test points therein coinciding with certain of said contacts on said screen; a first reflector positioned in front of said projector and a second reflector positioned behind said screen said first reflector being oriented to reflect light rays from said projector onto said second reflector and said second reflector being oriented to reflect said light rays onto the rear of said screen; electric conductors extending from each of said contacts on said screen through said reflector and parallel to the path of light beams passing from said second reflector to said screen; and means to provide predetermined electric potential to each of said conductors thereby simulating actual functioning of said circuit.

8. A training device as claimed in claim 7 and further characterized in that said wires leading from said test probe contacts on said screen terminate at terminal posts affixed to the rear of said second reflector.

9. A training device as claimed in claim 7 wherein said means to provide predetermined electric potential includes a programmer connecting said conductors to a power supply.

10. A training device comprising a rear projection screen having test probe contacts embedded therein, said contacts being accessible to test probes from the front face of said screen and carrying terminal means adjacent to the rear face of said screen; a first mirror; a slide projector aimed at said first mirror; a slide in said projector having a circuit diagram thereon including test points coinciding with certain of said contacts in said screen; a second mirror positioned behind said screen, said first mirror being oriented to reflect light from said projector onto said second mirror and said second mirror being oriented to project such light onto the rear of said screen; electric conductors extending from each of said contacts in said screen and through said second mirror parallel to the path of light rays passing from said second mirror to said screen; terminal posts affixed to the back of said mirror for said conductors; and a programmer electrically connected between said terminal posts and a power supply thereby providing predetermined electric potential to each of said conductors to simulate actual functioning of said circuit.

11. A training device comprising: a screen having test probe contacts thereon adapted to be contacted by test probes of electric test equipment; means to project a circuit diagram onto said screen with test points therein coinciding with certain of said contacts on said screen; and means to supply predetermined electric potential to said coinciding test points on said screen thereby simulating actual functioning of said circuit.

References Cited in the file of this patent
UNITED STATES PATENTS

| | | |
|---|---|---|
| 2,390,706 | Hearon | Dec. 11, 1945 |
| 2,838,849 | Finkel | June 17, 1958 |
| 2,882,618 | Thompson | Apr. 21, 1959 |
| 2,917,834 | Butler | Dec. 22, 1959 |